United States Patent Office 3,315,162
Patented Apr. 18, 1967

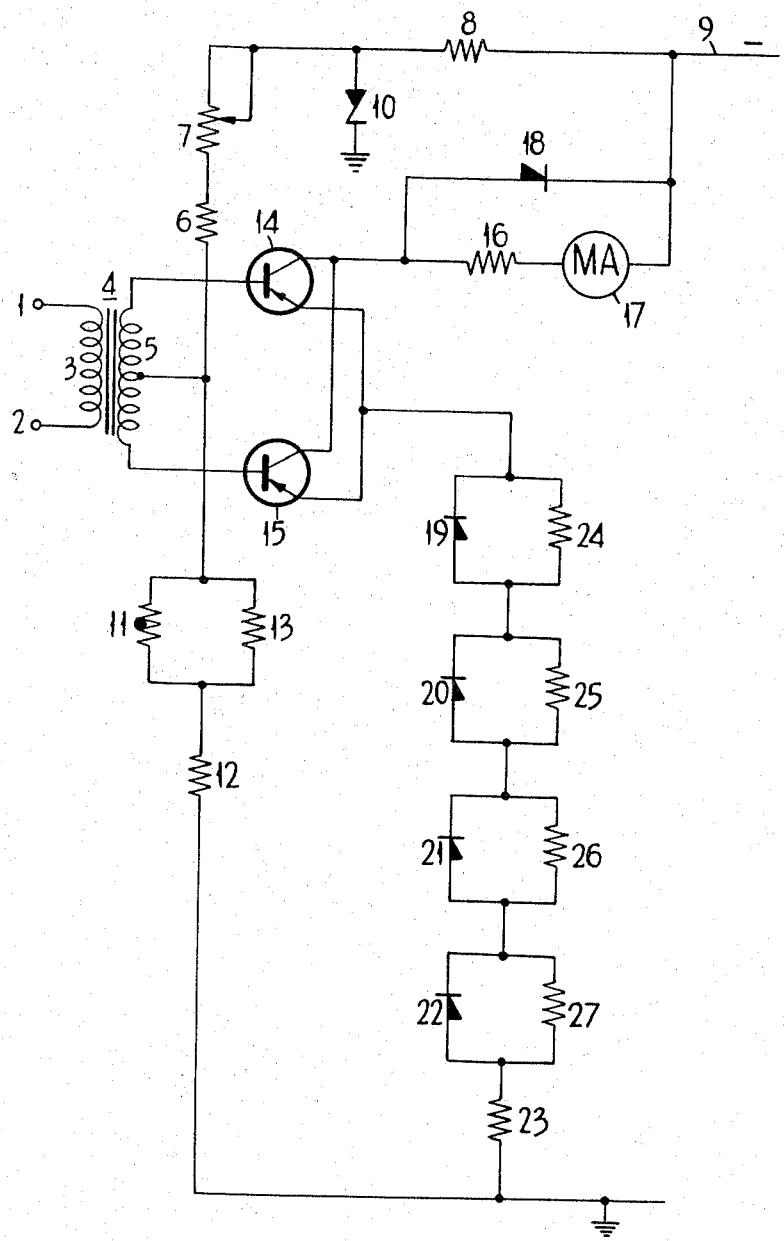

3,315,162
METER CIRCUIT USING BOTH DIODES AND TRANSISTORS TO GENERATE A SQUARE LAW FUNCTION
Robson Liddle, Coventry, England, assignor to The General Electric Company Limited, London, England
Filed Jan. 15, 1964, Ser. No. 337,817
Claims priority, application Great Britain, Jan. 15, 1963, 1,786/63
8 Claims. (Cl. 324—132)

This invention relates to electric measuring apparatus.

More particularly, but not exclusively, the invention relates to apparatus which may be used for measuring the power of a noise signal.

According to the present invention, electric measuring apparatus comprises two junction transistors, each having base, collector and emitter electrodes, means to supply an input oscillatory signal to the base electrodes of the transistors in phase opposition, a common load to which the emitter electrodes of both transistors are connected, the impedance of this load varying in dependence upon the potential at the emitter electrodes of the transistors, and means to indicate the value of the sum of the collector currents of the transistors, the arrangement being such that the sum of the collector currents of the transistors is at any time substantially proportional to the square of the instantaneous amplitude of the input signal.

Preferably said load is formed by a plurality of series-connected rectifier elements each of which is shunted by a respective resistor, the values of the resistors being such that as the potential at the emitter electrodes of the transistors increases in magnitude, the number of rectifier elements which are conducting progressively increases.

An ammeter may be provided to measure the sum of said collector currents.

Said means to supply the input signal to the base electrodes of the transistors may comprise a transformer having a primary and a secondary winding, the input signal being arranged to be supplied across the primary winding, and the ends of the secondary winding being connected to the base electrodes of the two transistors respectively.

Electric measuring apparatus in accordance with the present invention will now be described by way of example with reference to the accompanying drawing, which shows the circuit of the apparatus.

The apparatus to be described may, for example, be used for measuring the average power of a noise signal.

Referring now to the drawing, the apparatus comprises input terminals 1 and 2 which are connected to the two ends respectively of the primary winding 3 of a transformer 4. The secondary winding 5 of the transformer 4 has a centre tapping which is connected by way of resistors 6, 7 and 8 in series to a supply line 9 which is maintained at a negative potential. The resistor 7 is variable, and the junction of the resistors 7 and 8 is connected to earth by way of a Zener diode 10 which has its cathode terminal nearer earth. The centre tapping of the secondary winding 5 is also connected to earth by way of a thermistor 11 and a resistor 12 in series, the thermistor 11 being shunted by a resistor 13.

The ends of the secondary winding 5 are connected to the base electrodes of p-n-p silicon junction transistors 14 and 15, respectively. The collector electrodes of the transistors 14 and 15 are both connected by way of a resistor 16 and a milliammeter 17 in series to the supply line 9. The resistor 16 and milliammeter 17 are shunted by a rectifier element 18, which has its cathode terminal nearer the supply line 9.

The emitter electrodes of the transistors 14 and 15 are both connected to earth by way of similar rectifier elements 19, 20, 21 and 22, and a resistor 23 in series. Each of the rectifier elements 19, 20, 21 and 22 has its anode terminal nearer earth. The rectifier elements 19, 20, 21 and 22 are shunted by resistors 24, 25, 26 and 27, respectively. The values of the resistors 24, 25, 26 and 27 decrease in the order given, so that as the potential at the emitter electrodes of the transistors 14 and 15 increases in magnitude, the number of the rectifier elements 19, 20, 21 and 22 which are conducting progressively increases. The rectifier element 19 conducts first, then the rectifier elements 19 and 20, and so on.

The operation of the apparatus is then as follows. The noise signal, the power of which is to be measured, is supplied between the terminals 1 and 2, and is therefore supplied in phase opposition to the base electrodes of the transistors 14 and 15. This part of the apparatus therefore acts as a full-wave rectifier.

As previously indicated, the load presented to the emitter electrodes of the transistors 14 and 15 varies in dependence upon the potential at the emitter electrodes of the transistors 14 and 15, and this variation is arranged to be such that the sum of the collector currents of the transistors 14 and 15 is substantially proportional to the square of the instantaneous amplitude of the noise signal. The reading given by the ammeter 17 is therefore an indication of the power of the noise signal. If, as is probable, the response of the ammeter 17 is slow relative to the frequencies of the noise signal, the reading given is, in effect, a short term average of the power of the noise signal.

When the amplitude of the noise signal is so low that none of the rectifier elements 19, 20, 21 and 22 is conducting, the load presented to the emitter electrodes of the transistors 14 and 15 is substantially linear. To obtain the required variation in the sum of the collector currents with changes in amplitude of the noise signal at these low levels, the non-linear portions of the characteristics of the transistors 14 and 15 are used. The transistors 14 and 15 are brought to the required operating points by adjustment of the resistor 7. Silicon transistors are preferred to germanium transistors, because the non-linear portions of their characteristics are more stable with respect to variations in temperature.

The thermistor 11 is included to provide temperature compensation and so maintain the required response over the working temperature range.

The resistor 16 and rectifier element 18 provide overload protection for the ammeter 17.

I claim:
1. Electric measuring apparatus comprising two junction transistors each having base, collector and emitter electrodes, two input terminals, phase-splitting circuit means connected between said input terminals and the base electrodes of the transistors so that signals supplied to the input terminals are applied in phase opposition to the base electrodes, a load impedance which has a characteristic having a portion that is substantially a linear relation for small signals applied thereto and a portion that is substantially a square law relation for larger signals, circuit means to connect said load impedance to the emitter electrodes of the two transistors as a common emitter-load for both transistors, current indicator means, circuit means to connect said current indicator means to the collector electrodes of the two transistors so as to respond to the sum of the collector electrode currents of the two transistors, and biasing means connected to the base electrodes of the two transistors to bias the transistors to non-linear portions of their characteristics when an input signal supplied to said input terminals is sufficiently small for said load impedance to be operating over the substantially linear part of its characteristic so that there is a substantially square law relation between input signals applied to said input terminals and said sum of the collector electrode currents of the transistors when said load impedance is operating over either of said portions of its characteristic.

2. Electric measuring apparatus comprising two junction transistors, each having base, collector and emitter electrodes, two input terminals, phase-splitting circuit means connected between said input terminals and the base electrodes of said transistors so that signals in phase opposition are applied to said base electrodes, a common load whose impedance decreases with increase in voltage across it both linearly and as the square of that voltage, said load being connected in the emitter-base circuit of each of said transistors, the emitter electrodes being connected directly together and to said load, current indicator means connected to said collector electrodes, said collector electrodes being connected directly together, the indicator means indicating the sum of the collector currents of said transistors, and bias circuit means connected in series in the emitter-base circuit common to said transistors and set to cause operation of the transistors about the non-linear portions of their base/emitter characteristics thus providing a square law relation between input signals applied to said two input terminals and said sum of the collector currents for a range of current valves in said load including values corresponding to said non-linear portions of the transistor characteristics.

3. Apparatus according to claim 2 wherein said load comprises a plurality of series-connected rectifier elements each of which is shunted by a respective resistor, the values of the resistors being such that as the potential at the emitter electrodes of the transistors increases in magnitude, the number of rectifier elements which are conducting progressively increases.

4. Apparatus according to claim 2 wherein said current indicator means is an ammeter.

5. Apparatus according to claim 2 wherein said phase-splitting circuit means comprises a transformer having a primary and a secondary winding, said input signals being supplied across said primary winding, and the ends of said secondary winding being connected to said base electrodes of said two transistors respectively.

6. Apparatus according to claim 2 wherein said bias circuit means includes a temperature dependent impedance to maintain the required indication over the working temperature range.

7. Apparatus according to claim 6 wherein said temperature dependent impedance is a thermistor.

8. Apparatus according to claim 2 wherein said transistors are silicon junction transistors.

References Cited by the Examiner

UNITED STATES PATENTS 2,810,107  10/1957  Sauber.
3,071,759  1/1963  Kotas _____ 340—206
3,238,464  3/1966  Rechter _____ 324—105 X

FOREIGN PATENTS 860,681  2/1961  Great Britain.

WALTER L. CARLSON, *Primary Examiner.*

J. J. MULROONEY, *Assistant Examiner.*